(12) United States Patent
Ou-Yang et al.

(10) Patent No.: US 7,212,377 B1
(45) Date of Patent: May 1, 2007

(54) DISK DRIVE HAVING APERTURES NEAR THE ID OF A DISK STACK FOR ALLOWING AIRFLOW TO PASS THROUGH THE APERTURES TO REDUCE DISK FLUTTER

(75) Inventors: Jin Hui Ou-Yang, San Jose, CA (US); Lin Yang, San Jose, CA (US); Chiao-Ping R. Ku, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 447 days.

(21) Appl. No.: 10/815,507

(22) Filed: Mar. 31, 2004

(51) Int. Cl.
*G11B 17/038* (2006.01)
*G11B 25/04* (2006.01)
*G11B 33/14* (2006.01)

(52) U.S. Cl. .............. 360/99.12; 360/97.03; 360/98.01; 360/98.08

(58) Field of Classification Search .......... 360/97.01, 360/97.02, 97.03, 97.04, 98.01, 98.02, 98.03, 360/98.08, 99.05, 99.12, 98.07
See application file for complete search history.

(56) References Cited

U.S. PATENT DOCUMENTS

| | | | |
|---|---|---|---|
| 3,573,771 A * | 4/1971 | Cockrell, Jr. ............ | 360/97.04 |
| 3,975,769 A * | 8/1976 | King ....................... | 360/98.02 |
| 3,994,017 A * | 11/1976 | Barkhuff et al. ......... | 360/98.03 |
| 4,051,541 A * | 9/1977 | McGinnis et al. ....... | 360/98.02 |
| 4,345,285 A * | 8/1982 | DeMoss et al. .......... | 360/98.03 |
| 4,680,656 A | 7/1987 | Manzke et al. | |
| 4,707,752 A | 11/1987 | Gyi | |
| 4,819,105 A | 4/1989 | Edwards | |
| 4,922,354 A | 5/1990 | Edwards | |
| 5,179,483 A | 1/1993 | Lowe | |

FOREIGN PATENT DOCUMENTS

JP     02252185 A * 10/1990
WO    WO 2004051642 A1 *  6/2004

* cited by examiner

*Primary Examiner*—Craig A. Renner
(74) *Attorney, Agent, or Firm*—Joshua C. Harrison, Esq.

(57) ABSTRACT

A disk drive includes a disk clamp for clamping a plurality of disks to a spindle motor, and a disk spacer positioned between first and second disks. The first disk has a plurality of first disk through apertures adjacent its inner diameter. The first disk through apertures are circumferentially spaced-apart and extend longitudinally through the first disk. The disk spacer has a plurality of spacer apertures that are circumferentially spaced-apart and extend longitudinally through a portion of a thickness of the disk spacer. The disk clamp is adjacent to the first disk and has a plurality of clamp through apertures adjacent an outer diameter of the disk clamp. The clamp through apertures are circumferentially spaced-apart and extend longitudinally through the disk clamp. The first disk through apertures, the spacer apertures, and the clamp through apertures are aligned for allowing airflow to pass through when the plurality of disks is rotating.

5 Claims, 3 Drawing Sheets

DISK DRIVE HAVING APERTURES NEAR THE ID OF A DISK STACK FOR ALLOWING AIRFLOW TO PASS THROUGH THE APERTURES TO REDUCE DISK FLUTTER

BACKGROUND OF THE INVENTION

1. Field of the Invention

This invention relates to reducing disk flutter in a disk drive by having apertures near the ID ("inner diameter") of a disk stack for allowing airflow to pass though the apertures when the disks are rotating.

2. Description of the Prior Art and Related Information

A huge market exists for disk drives such as hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 40 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a disk drive base and a disk drive cover, at least one disk having at least one recording surface, a spindle motor for causing each disk to rotate, and an actuator arrangement. The printed circuit board assembly includes circuitry for processing signals and controlling operations. Actuator arrangements can be characterized as either linear or rotary; substantially every contemporary cost-competitive small form factor drive employs a rotary actuator arrangement.

In a typical disk drive, the rotating disks generate airflow within the interior of the head disk assembly. Such airflow creates an excitation force which affects track following by a respective head over a respective disk surface. This excitation force is caused by the spatiotemporal fluctuation of pressure generated mainly by the disturbance of airflow onto a rotating disk and an actuator arm. The airflow may include secondary airflows which move upward and downward in a longitudinal direction around the ID and OD ("outer diameter") of a disk. These secondary airflows impact disk vibration ("disk flutter") the most. The impact of the secondary airflows around the OD may be lessened with a tight shroud. However, a need remains to lessen the adverse effects of secondary airflows near the ID of the rotating disks.

SUMMARY OF THE INVENTION

This invention may be regarded as a disk drive including a disk drive base, a spindle motor attached to the disk drive base, a plurality of disks positioned on the spindle motor, the plurality of disks including a first disk and a second disk, the first disk having a plurality of first disk through apertures adjacent to an inner diameter of the first disk, the first disk through apertures being circumferentially spaced-apart and extending longitudinally through the first disk, a disk spacer positioned between the first and second disks, the disk spacer having a plurality of spacer apertures, the spacer apertures being circumferentially spaced-apart and extending longitudinally through a portion of a thickness of the disk spacer, and a disk clamp for clamping the plurality of disks to the spindle motor. The disk clamp is adjacent to the first disk and has a plurality of clamp through apertures adjacent to an outer diameter of the disk clamp, the clamp through apertures being circumferentially spaced-apart and extending longitudinally through the disk clamp. The first disk through apertures, the spacer apertures, and the clamp through apertures are aligned for allowing airflow to pass through the apertures when the plurality of disks are rotating.

DETAILED DESCRIPTION

Figure 1:
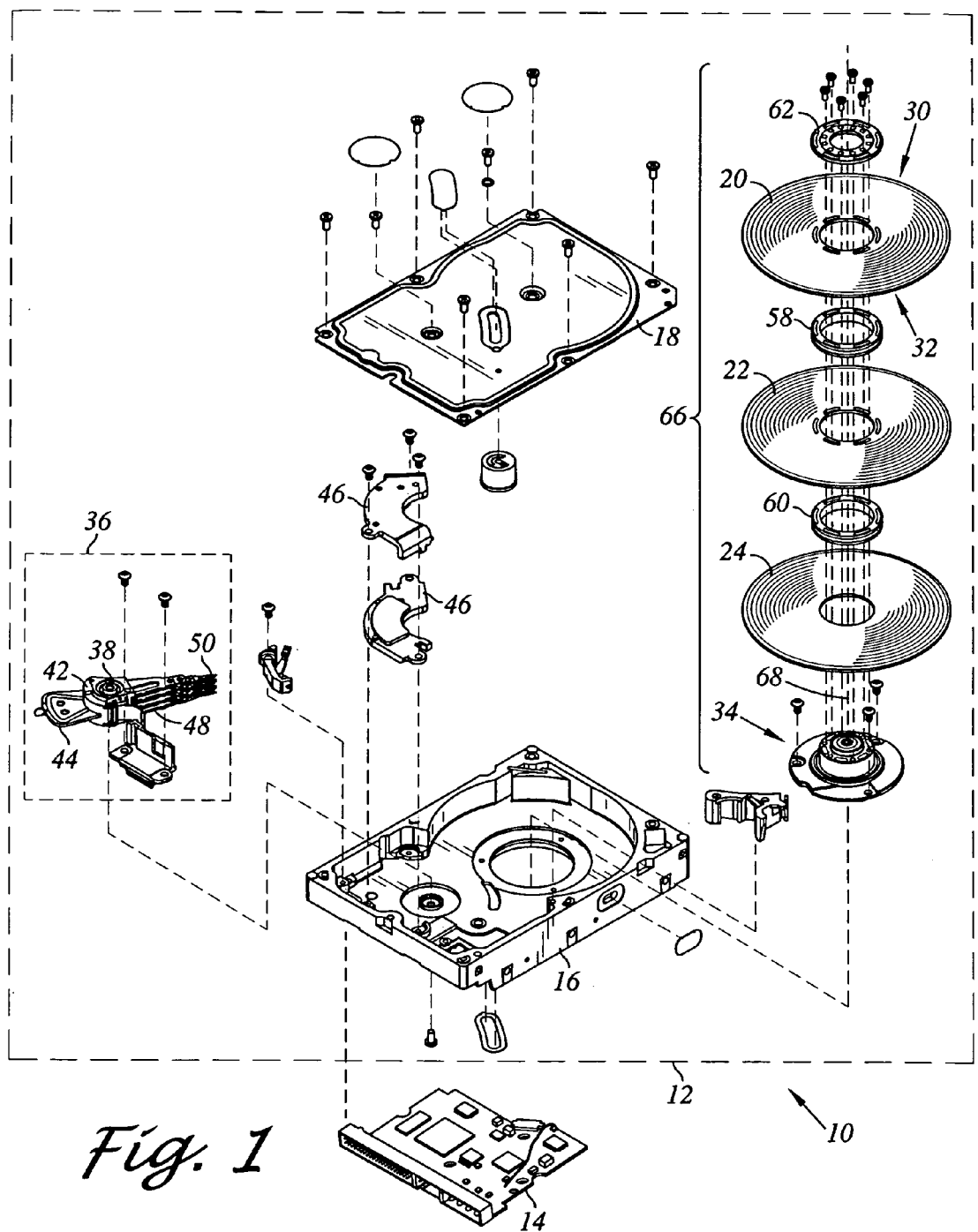
FIG. 1 is an exploded perspective view of a disk drive incorporating an embodiment of this invention.
Figure 2:
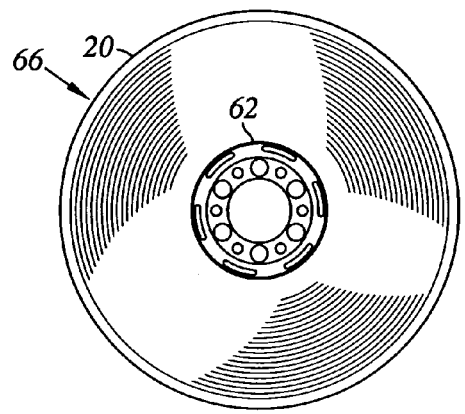
FIG. 2 is a top plan view of the disk stack shown in FIG. 1.
Figure 6:
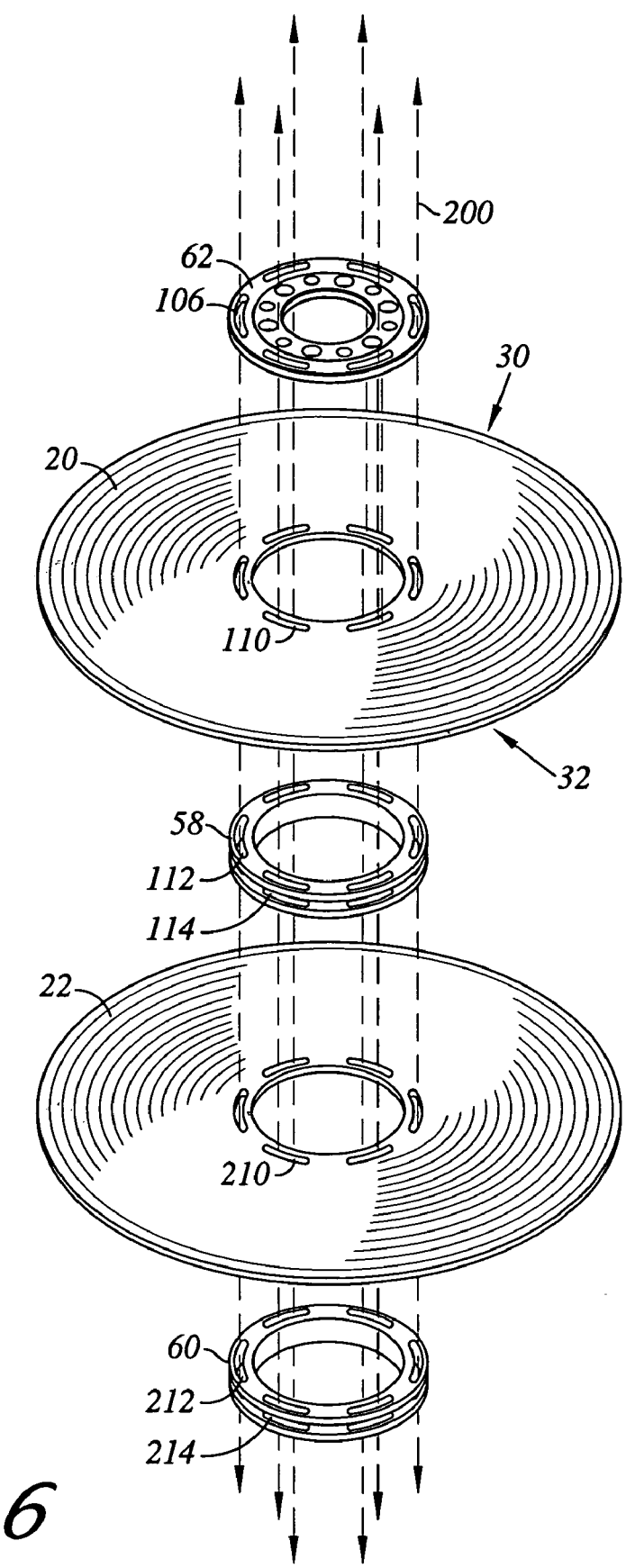
FIG. 6 is an enlarged exploded perspective view of a portion of the disk stack shown in FIG. 1.

With reference to FIGS. 1 and 6, a disk drive 10 includes a disk drive base 16, a spindle motor 34 attached to disk drive base 16, a plurality of disks positioned on spindle motor 34, the plurality of disks including a first disk 20 and a second disk 22, first disk 20 having a plurality of first disk through apertures 110 adjacent to an inner diameter of first disk 20, first disk through apertures 110 being circumferentially spaced-apart and extending longitudinally through first disk 20, a disk spacer 58 positioned between first 20 and second 22 disks, disk spacer 58 having a plurality of spacer apertures 112, spacer apertures 112 being circumferentially spaced-apart and extending longitudinally through a portion of a thickness of disk spacer 58, and a disk clamp 62 for clamping the plurality of disks to spindle motor 34. Disk clamp 62 is adjacent to first disk 20 and has a plurality of clamp through apertures 106 adjacent to an outer diameter of disk clamp 62, clamp through apertures 106 being circumferentially spaced-apart and extending longitudinally through disk clamp 62, wherein first disk through apertures 110, spacer apertures 112, and clamp through apertures 106 are aligned for allowing airflow 200 to pass through the apertures when the plurality of disks are rotating.

Continuing with FIG. 1, disk drive 10 includes a head disk assembly 12 and a printed circuit board assembly 14. Disk drive 10 includes a disk drive cover 18, a head stack assembly 36, and a permanent magnet arrangement defined by upper and lower VCM plates 46. Head stack assembly 36 includes an actuator body 42, a plurality of actuator arms 48, a pivot bearing cartridge 38 installed within a bore of actuator body 42, and a coil portion 44 having a voice coil. A respective head gimbal assembly 50 is attached to each respective actuator arm 48. Spindle motor 34 includes a shaft which defines a longitudinal axis 68. As shown in FIG. 1, a disk stack 66 generally includes spindle motor 34, disks 20, 22, 24, disk spacers 58, 60, and a disk clamp 62 for clamping disks 20, 22, and 24 to spindle motor 34 via suitable fasteners such as screws. Each disk may include a top recording surface 30 and a bottom recording surface 32. In alternative embodiments, disk drive 10 may include less than three disks, such as two disks, or may include more than three disks.

In the embodiment shown in FIGS. 1 and 6, disk drive 10 includes second disk 22 having a plurality of second disk through apertures 210 adjacent to an inner diameter of second disk 22 and a second disk spacer 60 having a plurality of spacer apertures 212, second disk through apertures 210 being circumferentially spaced-apart and extending longitudinally through second disk 22 and spacer apertures 212 being circumferentially spaced-apart and extending longitudinally through a portion of a thickness of second disk spacer 60. In an alternative embodiment, third disk 24 may also include a plurality of third disk through apertures which are aligned with the spacer apertures 214 of second disk spacer 60. In such an alternative embodiment, the spindle motor flange may include a corresponding set of apertures aligned with the third disk through apertures to allow airflow to pass through. In the embodiment shown in FIGS. 1 and 6, the disk through apertures, the spacer apertures, and the clamp through apertures are radially and circumferentially aligned, i.e., the apertures are positioned above each other allowing for a maximum amount of airflow to pass through, thereby reducing disk flutter. In alternative embodiments, the apertures may be radially and/or circumferentially offset relative to each other in a manner allowing for sufficient airflow to pass through the apertures when the disks are rotating, thereby also reducing disk flutter.

Figure 3:
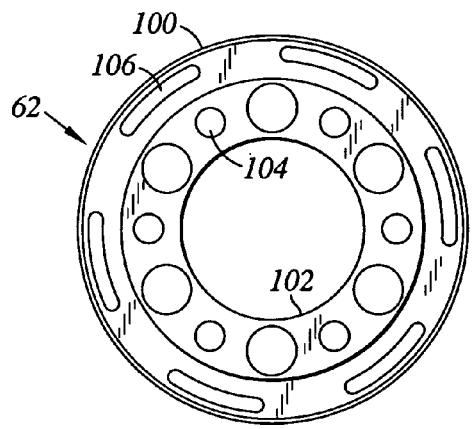
FIG. 3 is a top plan view of the disk clamp shown in FIG. 1.

With reference to FIG. 3, disk clamp 62 includes an inner diameter 102, an outer diameter 100, a plurality of fastener apertures 104 for receiving fasteners such as screws, and clamp through apertures 106 which are generally equally circumferentially spaced-apart.

Figure 4:
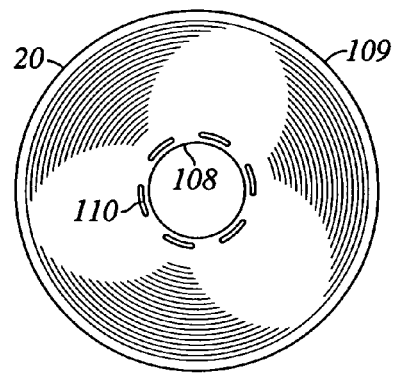
FIG. 4 is a top plan view of a magnetic disk in accordance with an embodiment of this invention.

With reference to FIG. 4, a magnetic disk is shown, such as disk 20, for a disk drive being subject to airflow within its interior, wherein the magnetic disk includes an inner diameter 108, an outer diameter 109, a plurality of disk through apertures (such as first disk through apertures 110) adjacent to inner diameter 108, the disk through apertures being circumferentially spaced-apart and extending longitudinally through the magnetic disk, wherein the disk through apertures allow airflow to pass through when the magnetic disk is rotating. As shown, disk through apertures 110 are generally equally circumferentially spaced-apart. The magnetic disk may be made by first forming through apertures in a disk substrate via a stamping operation and then depositing the various layers on the disk substrate such as an underlayer, a magnetic layer, and a protective layer.

Figure 5A:
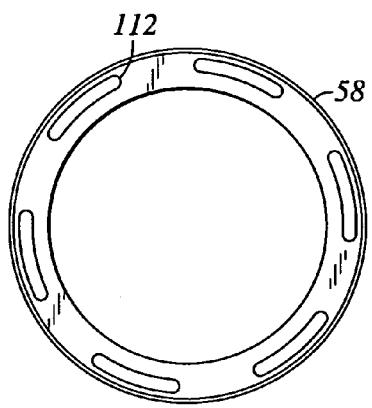
FIG. 5A is a top plan view of a disk spacer in accordance with an embodiment of this invention.
Figure 5B:
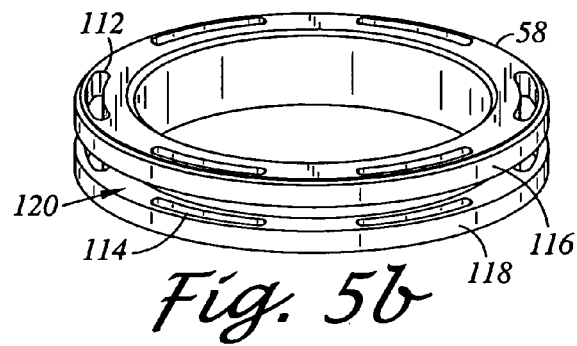
FIG. 5B is a perspective view of the disk spacer shown in FIG. 5A.

With reference to FIGS. 5A and 5B, disk spacer 58 includes spacer apertures 112 on an upper ring 116 and corresponding spacer apertures 114 on a bottom ring 118. Each spacer aperture is a through aperture which together allow airflow to pass through. Upper ring 116 and bottom ring 118 are configured to define a generally U-shaped opening 120 in cross section view of disk spacer. In an alternative embodiment, disk spacer 58 may include a single set of circumferentially spaced-apart spacer through apertures extending through the thickness of disk spacer 58, in a manner similar to disk clamp 62. The spacer apertures, as well as the clamp through apertures shown in FIG. 3, may be formed via a suitable stamping and/or machining operation. The number and shape of the disk through apertures, spacer apertures, and the clamp through apertures may be different than what's shown in the figures.

What is claimed is:

1. A disk drive comprising:
    a disk drive base;
    a spindle motor attached to the disk drive base;
    a plurality of disks positioned on the spindle motor, the plurality of disks including a first disk and a second disk, the first disk having a plurality of first disk through apertures adjacent to an inner diameter of the first disk, the first disk through apertures being circumferentially spaced-apart and extending longitudinally through the first disk;
    a disk spacer positioned between the first and second disks, the disk spacer having a plurality of spacer apertures, the spacer apertures being circumferentially spaced-apart and extending longitudinally through a portion of a thickness of the disk spacer;
    a disk clamp for clamping the plurality of disks to the spindle motor, the disk clamp being adjacent to the first disk, the disk clamp having a plurality of clamp through apertures adjacent to an outer diameter of the disk clamp, the clamp through apertures being circumferentially spaced-apart and extending longitudinally through the disk clamp;
    wherein the first disk through apertures, the spacer apertures, and the clamp through apertures are aligned for allowing airflow to pass through the apertures when the plurality of disks are rotating.

2. The disk drive of claim 1, wherein the first disk through apertures are generally equally circumferentially spaced-apart.

3. The disk drive of claim 1, wherein the clamp through apertures are generally equally circumferentially spaced-apart.

4. The disk drive of claim 1, wherein the spacer apertures are generally equally circumferentially spaced-apart.

5. The disk drive of claim 1, wherein the first disk through apertures, the spacer apertures, and the clamp through apertures are radially and circumferentially aligned.

* * * * *